US010320825B2

(12) United States Patent
Mermoud et al.

(10) Patent No.: US 10,320,825 B2
(45) Date of Patent: Jun. 11, 2019

(54) FINGERPRINT MERGING AND RISK LEVEL EVALUATION FOR NETWORK ANOMALY DETECTION

(71) Applicant: Cisco Technology, Inc., San Jose, CA (US)

(72) Inventors: Grégory Mermoud, Veyras (CH); Jean-Philippe Vasseur, Anchorage, AK (US); Yannick Weibel, Lausanne (CH)

(73) Assignee: Cisco Technology, Inc., San Jose, CA (US)

( * ) Notice: Subject to any disclaimer, the term of this patent is extended or adjusted under 35 U.S.C. 154(b) by 142 days.

(21) Appl. No.: 15/072,526

(22) Filed: Mar. 17, 2016

(65) Prior Publication Data
US 2016/0352765 A1 Dec. 1, 2016

Related U.S. Application Data

(60) Provisional application No. 62/166,974, filed on May 27, 2015, provisional application No. 62/166,970, filed on May 27, 2015.

(51) Int. Cl.
*H04L 29/06* (2006.01)
*G06F 21/64* (2013.01)

(52) U.S. Cl.
CPC ........ *H04L 63/1425* (2013.01); *H04L 63/145* (2013.01); *H04L 63/1458* (2013.01); *G06F 21/64* (2013.01); *H04L 63/1441* (2013.01)

(58) Field of Classification Search
CPC ............. H04L 63/1408; H04L 63/1441; G06F 17/30702; G06F 21/64; G06Q 10/639

USPC .......................................................... 726/23
See application file for complete search history.

(56) References Cited

U.S. PATENT DOCUMENTS

| 7,920,983 | B1 * | 4/2011 | Peleg | G01M 3/2807 |
| | | | | 137/1 |
| 8,286,237 | B2 * | 10/2012 | Moghe | H04L 63/1408 |
| | | | | 726/22 |
| 8,341,106 | B1 * | 12/2012 | Scolnicov | G06N 7/005 |
| | | | | 702/50 |
| 8,555,077 | B2 | 10/2013 | Davis et al. | |

(Continued)

OTHER PUBLICATIONS

Årnes et al. "Real-Time Risk Assessment with Network Sensors and Intrusion Detection Systems" Stochastic Models for Combined Security and Dependability Evaluation (2007): 95.

(Continued)

*Primary Examiner* — Bryan F Wright
(74) *Attorney, Agent, or Firm* — Behmke Innovation Group LLC; James Behmke; Stephen D. LeBarron

(57) ABSTRACT

A device in a network receives fingerprints of two or more network anomalies detected in the network by different anomaly detectors. Each fingerprint comprises a hash of tags that describe a detected anomaly. The device associates the fingerprints with network records captured within a timeframe in which the two or more network anomalies were detected. The device compares the fingerprints associated with the network records to determine that the two or more detected anomalies are part of a singular anomaly event. The device generates a notification regarding the singular anomaly event. The notification includes those of the fingerprints that are associated with the singular anomaly event.

18 Claims, 12 Drawing Sheets

(56) References Cited

U.S. PATENT DOCUMENTS

| | | | | |
|---|---|---|---|---|
| 2003/0053448 | A1* | 3/2003 | Craig | H04L 67/2814 |
| | | | | 370/353 |
| 2004/0193943 | A1* | 9/2004 | Angelino | H04L 63/1408 |
| | | | | 714/4.1 |
| 2006/0229931 | A1* | 10/2006 | Fligler | G06Q 10/0639 |
| | | | | 705/7.38 |
| 2008/0215576 | A1* | 9/2008 | Zhao | G06F 17/30702 |
| 2014/0082407 | A1* | 3/2014 | Kochut | H04L 41/00 |
| | | | | 714/2 |
| 2015/0058680 | A1* | 2/2015 | Kortti | G06F 11/368 |
| | | | | 714/47.2 |
| 2016/0080173 | A1* | 3/2016 | Quick | H04L 25/02 |
| | | | | 705/7.31 |
| 2017/0013017 | A1* | 1/2017 | Chen | H04L 63/20 |
| 2017/0279828 | A1* | 9/2017 | Savalle | H04L 63/1416 |

OTHER PUBLICATIONS

Lakhina et al., "Characterization of Network-Wide Anomalies in Traffic Flows", IMC '04, Proceedings of the 4th ACM SIGCOMM Conference on Internet Measurement, Oct. 2004, pp. 201-206, Taormina, Sicily, Italy.

Rehák et al., "Adaptive Multiagent System for Network Traffic Monitoring", IEEE Intelligent Systems, vol. 24, Issue 3, May-Jun. 2009, pp. 15-25, IEEE Computer Society, Piscataway, NJ, USA.

* cited by examiner

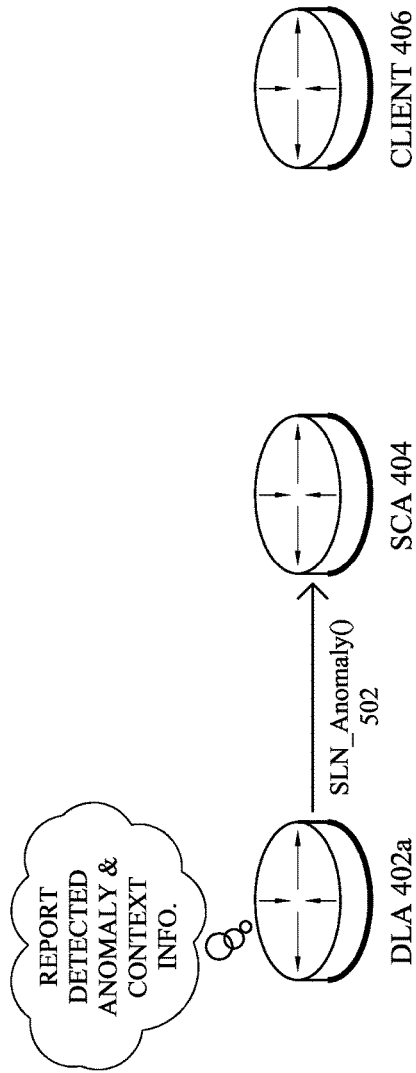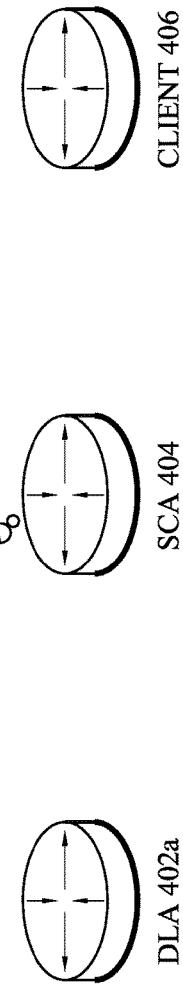

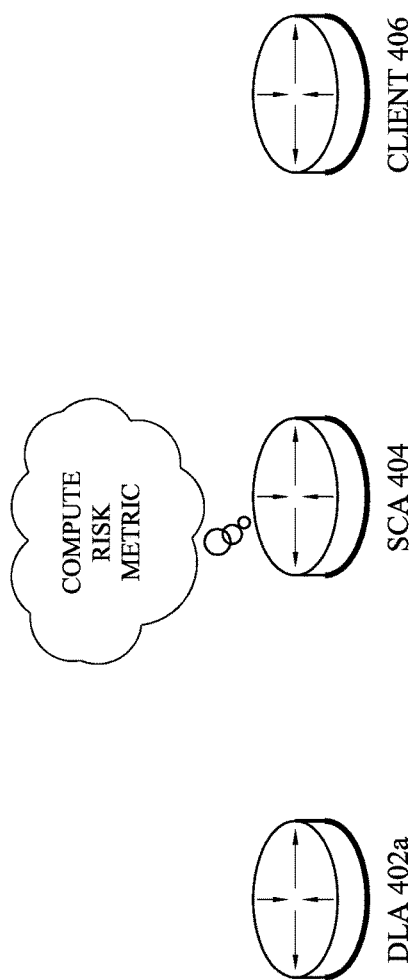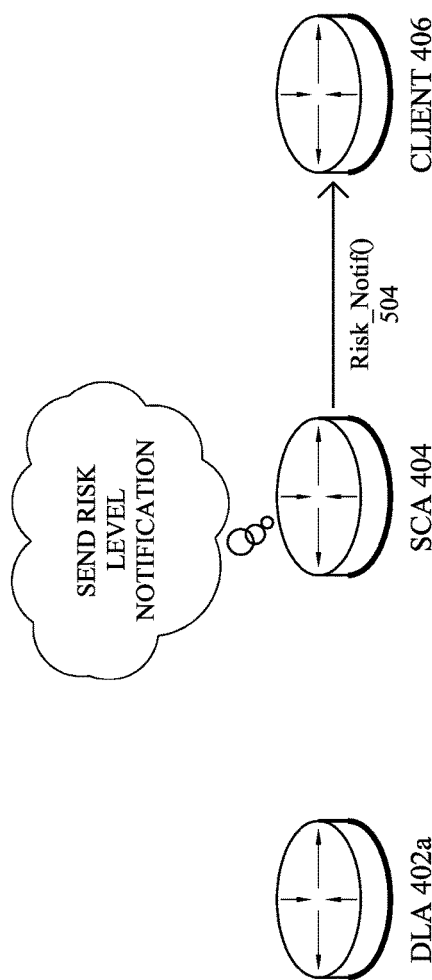

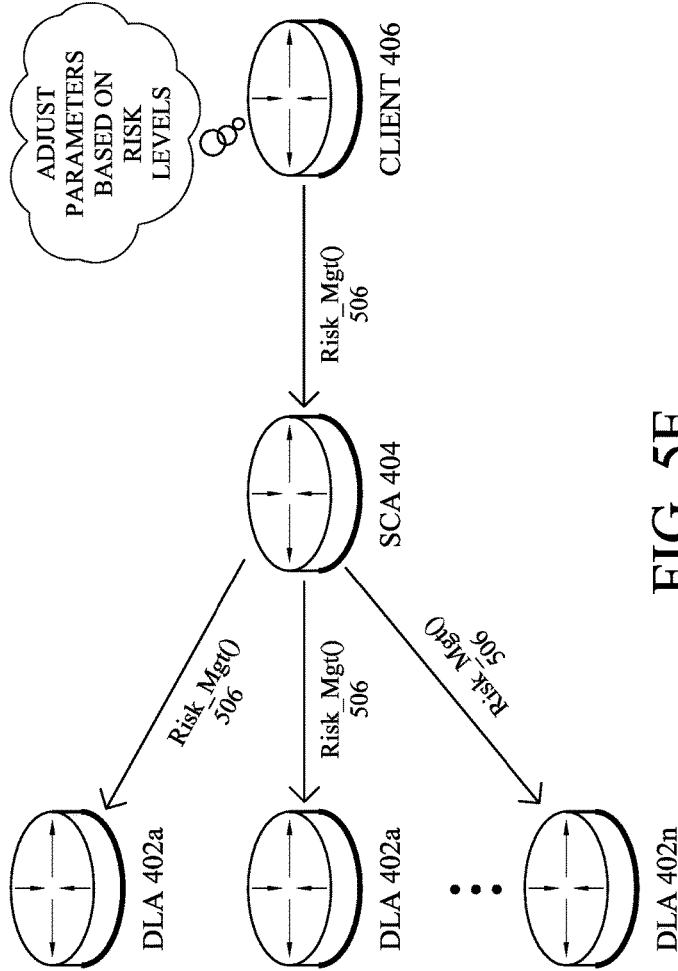
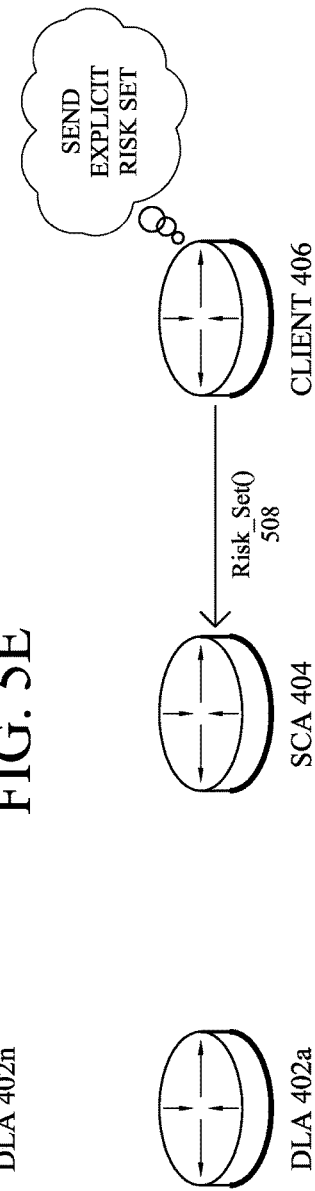
FIG. 5E
FIG. 5F

FINGERPRINT MERGING AND RISK LEVEL EVALUATION FOR NETWORK ANOMALY DETECTION

RELATED APPLICATIONS

This application claims priority to U.S. Provisional Application No. 62/166,974, filed May 27, 2015, entitled "MERGING FINGERPRINTS IN INTERNET BEHAVIORAL ANALYSIS," by Mermoud et al., and to U.S. Provisional Application No. 62/166,970, filed May 27, 2015, entitled "DYNAMIC TRACKING/MODELING OF SYSTEMS ACCORDING TO RISK LEVEL," by Vasseur et al., the contents both of which are hereby incorporated by reference.

TECHNICAL FIELD

The present disclosure relates generally to computer networks, and, more particularly, to merging anomaly fingerprints and evaluating risk levels in a network anomaly detection system.

BACKGROUND

Enterprise networks are carrying a very fast growing volume of both business and non-business critical traffic. Often, business applications such as video collaboration, cloud applications, etc., use the same hypertext transfer protocol (HTTP) and/or HTTP secure (HTTPS) techniques that are used by non-business critical web traffic. This complicates the task of optimizing network performance for specific applications, as many applications use the same protocols, thus making it difficult to distinguish and select traffic flows for optimization.

BRIEF DESCRIPTION OF THE DRAWINGS

The embodiments herein may be better understood by referring to the following description in conjunction with the accompanying drawings in which like reference numerals indicate identically or functionally similar elements, of which:

FIGS. 5A-5F illustrate examples of anomaly handling in an SLN;

DESCRIPTION OF EXAMPLE EMBODIMENTS

Overview

Figure 1A:
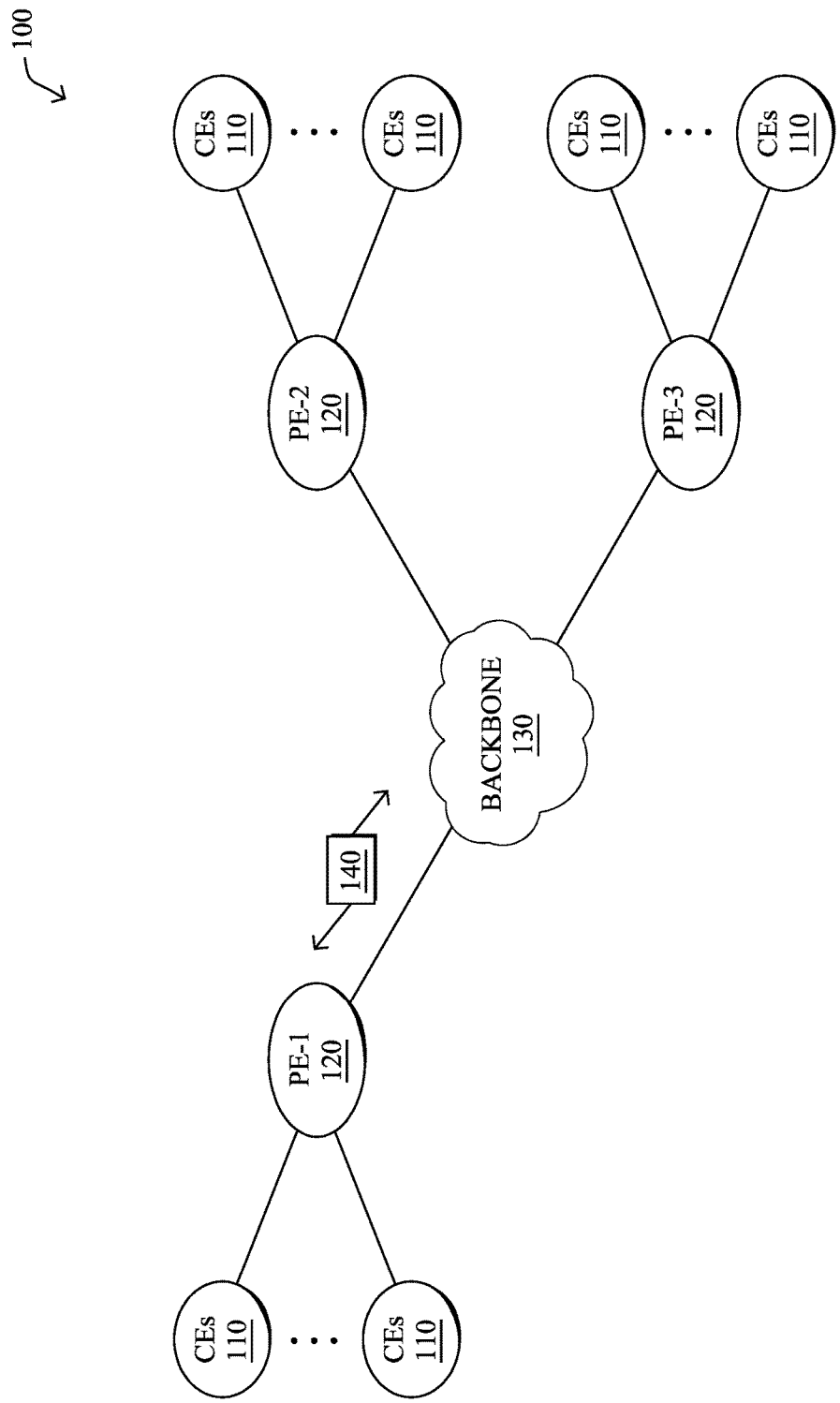
FIGS. 1A-1B illustrate an example communication network.

According to one or more embodiments of the disclosure, a device in a network receives fingerprints of two or more network anomalies detected in the network by different anomaly detectors. Each fingerprint comprises a hash of tags that describe a detected anomaly. The device associates the fingerprints with network records captured within a timeframe in which the two or more network anomalies were detected. The device compares the fingerprints associated with the network records to determine that the two or more detected anomalies are part of a singular anomaly event. The device generates a notification regarding the singular anomaly event, wherein the notification includes those of the fingerprints that are associated with the singular anomaly event.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potential a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
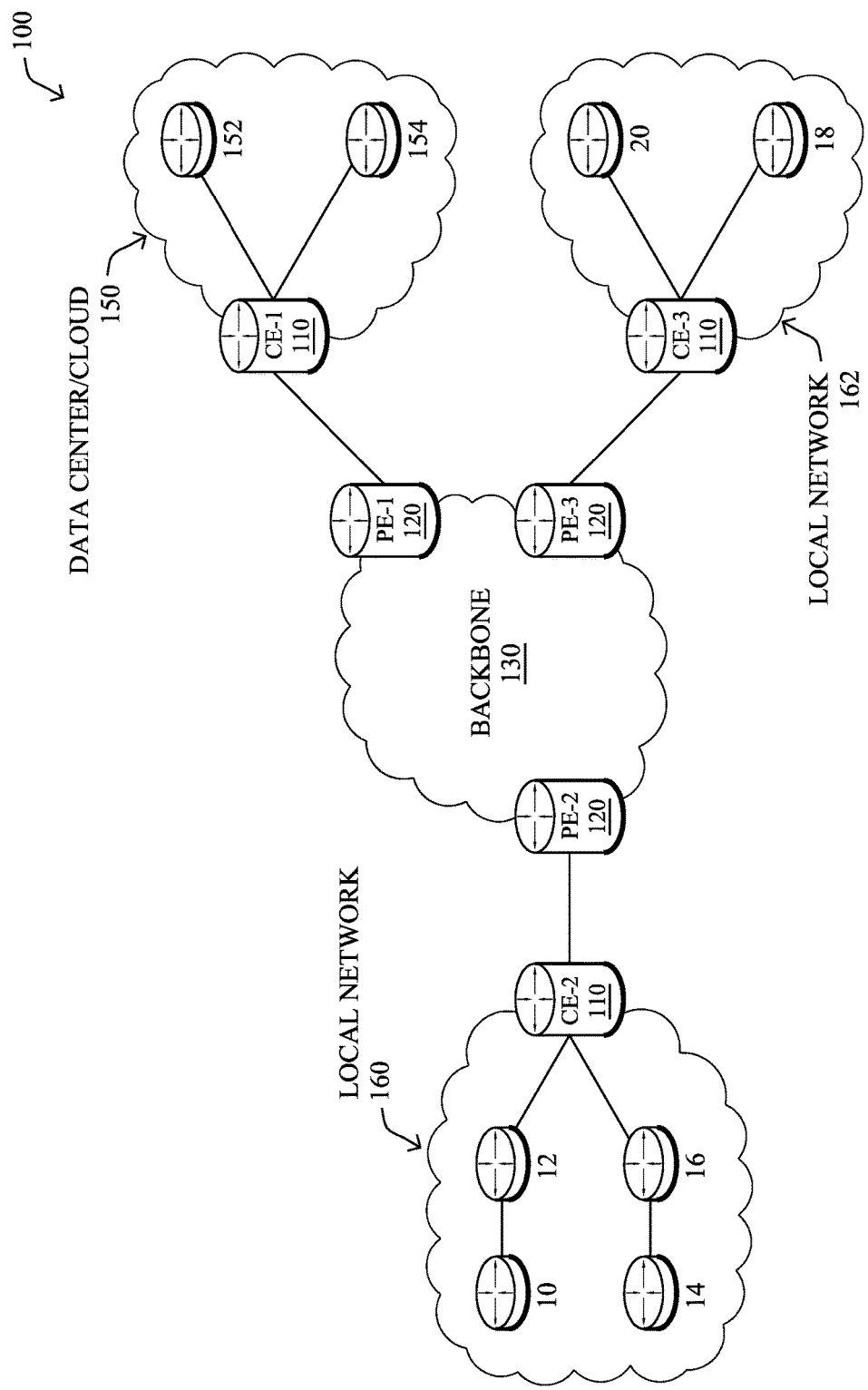

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
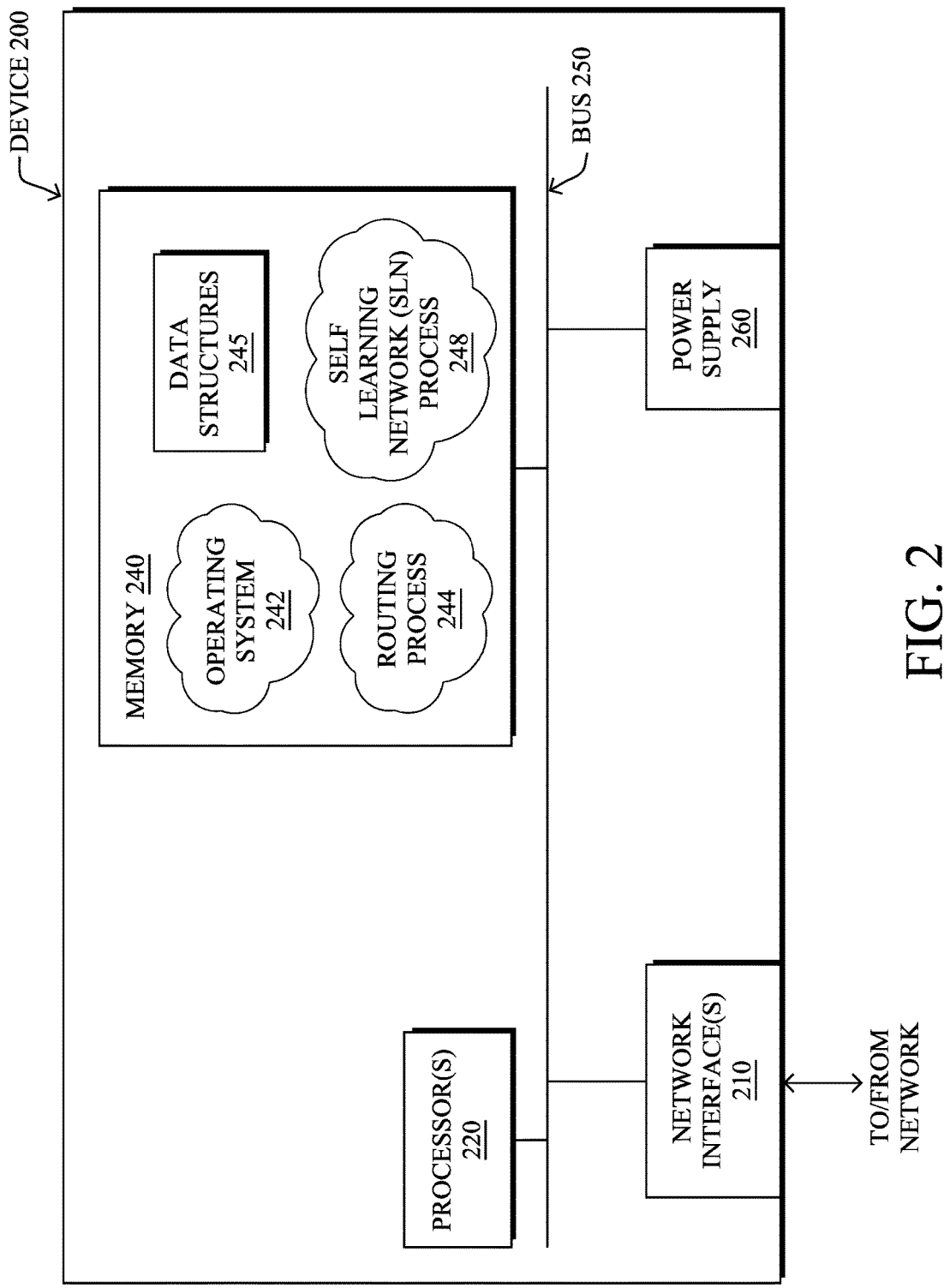
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise routing process 244 (e.g., routing services) and illustratively, a self learning network (SLN) process 248 and/or a fingerprint merging process 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Routing process/services 244 include computer executable instructions executed by processor 220 to perform functions provided by one or more routing protocols, such as the Interior Gateway Protocol (IGP) (e.g., Open Shortest Path First, "OSPF," and Intermediate-System-to-Intermediate-System, "IS-IS"), the Border Gateway Protocol (BGP), etc., as will be understood by those skilled in the art. These functions may be configured to manage a forwarding information database including, e.g., data used to make forwarding decisions. In particular, changes in the network topology may be communicated among routers 200 using routing protocols, such as the conventional OSPF and IS-IS link-state protocols (e.g., to "converge" to an identical view of the network topology).

Notably, routing process 244 may also perform functions related to virtual routing protocols, such as maintaining VRF instance, or tunneling protocols, such as for MPLS, generalized MPLS (GMPLS), etc., each as will be understood by those skilled in the art. Also, EVPN, e.g., as described in the IETF Internet Draft entitled "BGP MPLS Based Ethernet VPN"<draft-ietf-l2vpn-evpn>, introduce a solution for multipoint L2VPN services, with advanced multi-homing capabilities, using BGP for distributing customer/client media access control (MAC) address reach-ability information over the core MPLS/IP network.

SLN process 248 includes computer executable instructions that, when executed by processor(s) 220, cause device 200 to perform anomaly detection functions as part of an anomaly detection infrastructure within the network. In general, anomaly detection attempts to identify patterns that do not conform to an expected behavior. For example, in one embodiment, the anomaly detection infrastructure of the network may be operable to detect network attacks (e.g., DDoS attacks, the use of malware such as viruses, rootkits, etc.). However, anomaly detection in the context of computer networking typically presents a number of challenges: 1.) a lack of a ground truth (e.g., examples of normal vs. abnormal network behavior), 2.) being able to define a "normal" region in a highly dimensional space can be challenging, 3.) the dynamic nature of the problem due to changing network behaviors/anomalies, 4.) malicious behaviors such as malware, viruses, rootkits, etc. may adapt in order to appear "normal," and 5.) differentiating between noise and relevant anomalies is not necessarily possible from a statistical standpoint, but typically also requires domain knowledge.

Anomalies may also take a number of forms in a computer network: 1.) point anomalies (e.g., a specific data point is abnormal compared to other data points), 2.) contextual anomalies (e.g., a data point is abnormal in a specific context but not when taken individually), or 3.) collective anomalies (e.g., a collection of data points is abnormal with regards to an entire set of data points). Generally, anomaly detection refers to the ability to detect an anomaly that could be triggered by the presence of malware attempting to access data (e.g., data exfiltration), spyware, ransom-ware, etc. and/or non-malicious anomalies such as misconfigurations or misbehaving code. Particularly, an anomaly may be raised in a number of circumstances:

Security threats: the presence of a malware using unknown attacks patterns (e.g., no static signatures) may lead to modifying the behavior of a host in terms of traffic patterns, graphs structure, etc. Such anomalies may be detected using advanced ML processes(s) capable of modeling subtle changes or correlation between changes (e.g., unexpected behavior) in a highly dimensional space. Such anomalies are raised in order to detect the presence of a 0-day malware; such a malware may be used in order to perform data ex-filtration thanks to a Command and Control (C2) channel, or even to trigger (Distributed) Denial of Service (DoS) such as DNS reflection, UDP flood, HTTP recursive get, etc. In the case of a (D)DoS, although technical an anomaly, the term "DoS" is usually used.

Malware may be detected because of their impact on traffic, host models, graph-based analysis, etc., when attempting to connect to C2 channel, move laterally, or ex-filtrate information using various techniques.

Misbehaving devices: a device such as a laptop, a server of a network device (e.g., storage, router, switch, printer, etc.) may misbehave in a network for a number of reasons: 1.) a user using a discovery tool that performs (massive) undesirable scanning in the network (in contrast with a lawful scanning by a network management tool performing device discovery), 2.) a software defect (e.g. a switch or router dropping packet because of a corrupted RIB/FIB or the presence of a persistent loop by a routing protocol hitting a corner case).

Dramatic behavior change: the introduction of a new networking or end-device configuration, or even the introduction of a new application may lead to dramatic behavioral changes. Although technically not anomalous, a SLN-enabled node having computed behavioral model(s) may raise an anomaly when detecting a brutal behavior change. Note that in such as case, although an anomaly may be raised, a learning system such as SLN is expected to learn the new behavior and dynamically adapts according to potential user feedback.

Misconfigured devices: a configuration change may trigger an anomaly: a misconfigured ACL, route redistribution policy, routing policy, QoS policy maps, or the like, may have dramatic consequences such a traffic black-hole, QoS degradation, etc. Such misconfiguration may be advantageously identified by SLN process 248, in order to be detected and fixed.

In various embodiments, SLN process 248 may utilize machine learning techniques, to perform anomaly detection in the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function would be the number of misclassified points. The learning process then operates by adjusting the parameters a,b,c such that the number of misclassified points is minimal. After this optimization phase (or learning phase), the model M can be used very easily to classify new data points. Often, M is a statistical model, and the cost function is inversely proportional to the likelihood of M, given the input data.

Computational entities that rely on one or more machine learning techniques to perform a task for which they have not been explicitly programmed to perform are typically referred to as learning machines. In particular, learning machines are capable of adjusting their behavior to their environment. For example, a learning machine may dynamically make future predictions based on current or prior network measurements, may make control decisions based on the effects of prior control commands, etc.

For purposes of anomaly detection in a network, a learning machine may construct a model of normal network behavior, to detect data points that deviate from this model. For example, a given model (e.g., a supervised, un-supervised, or semi-supervised model) may be used to generate and report anomaly scores to another device. Example machine learning techniques that may be used to construct and analyze such a model may include, but are not limited to, nearest neighbor (NN) techniques (e.g., k-NN models, replicator NN models, etc.), statistical techniques (e.g., Bayesian networks, etc.), clustering techniques (e.g., k-means, etc.), neural networks (e.g., reservoir networks, artificial neural networks, etc.), support vector machines (SVMs), or the like.

One class of machine learning techniques that is of particular use in the context of anomaly detection is clustering. Generally speaking, clustering is a family of techniques that seek to group data according to some typically predefined notion of similarity. For instance, clustering is a very popular technique used in recommender systems for grouping objects that are similar in terms of people's taste (e.g., because you watched X, you may be interested in Y, etc.). Typical clustering methodologies are k-means, density based spatial clustering of applications with noise (DBSCAN) and mean-shift, where a distance to a cluster is computed with the hope of reflecting a degree of anomaly (e.g., using a Euclidian distance and a cluster based local outlier factor that takes into account the cluster density).

Replicator techniques may also be used for purposes of anomaly detection. Such techniques generally attempt to replicate an input in an unsupervised manner by projecting the data into a smaller space (e.g., compressing the space, thus performing some dimensionality reduction) and then reconstructing the original input, with the objective of keeping the "normal" pattern in the low dimensional space. Example techniques that fall into this category include principal component analysis (PCA) (e.g., for linear models), multi-layer perceptron (MLP) ANNs (e.g., for non-linear models), and replicating reservoir networks (e.g., for non-linear models, typically for time series).

According to various embodiments, SLN process 248 may also use graph-based models for purposes of anomaly detection. Generally speaking, a graph-based model attempts to represent the relationships between different entities as a graph of nodes interconnected by edges. For example, ego-centric graphs have been used to represent the relationship between a particular social networking profile and the other profiles connected to it (e.g., the connected "friends" of a user, etc.). The patterns of these connections can then be analyzed for purposes of anomaly detection. For example, in the social networking context, it may be considered anomalous for the connections of a particular profile not to share connections, as well. In other words, a person's social connections are typically also interconnected. If no such interconnections exist, this may be deemed anomalous.

Figure 3:
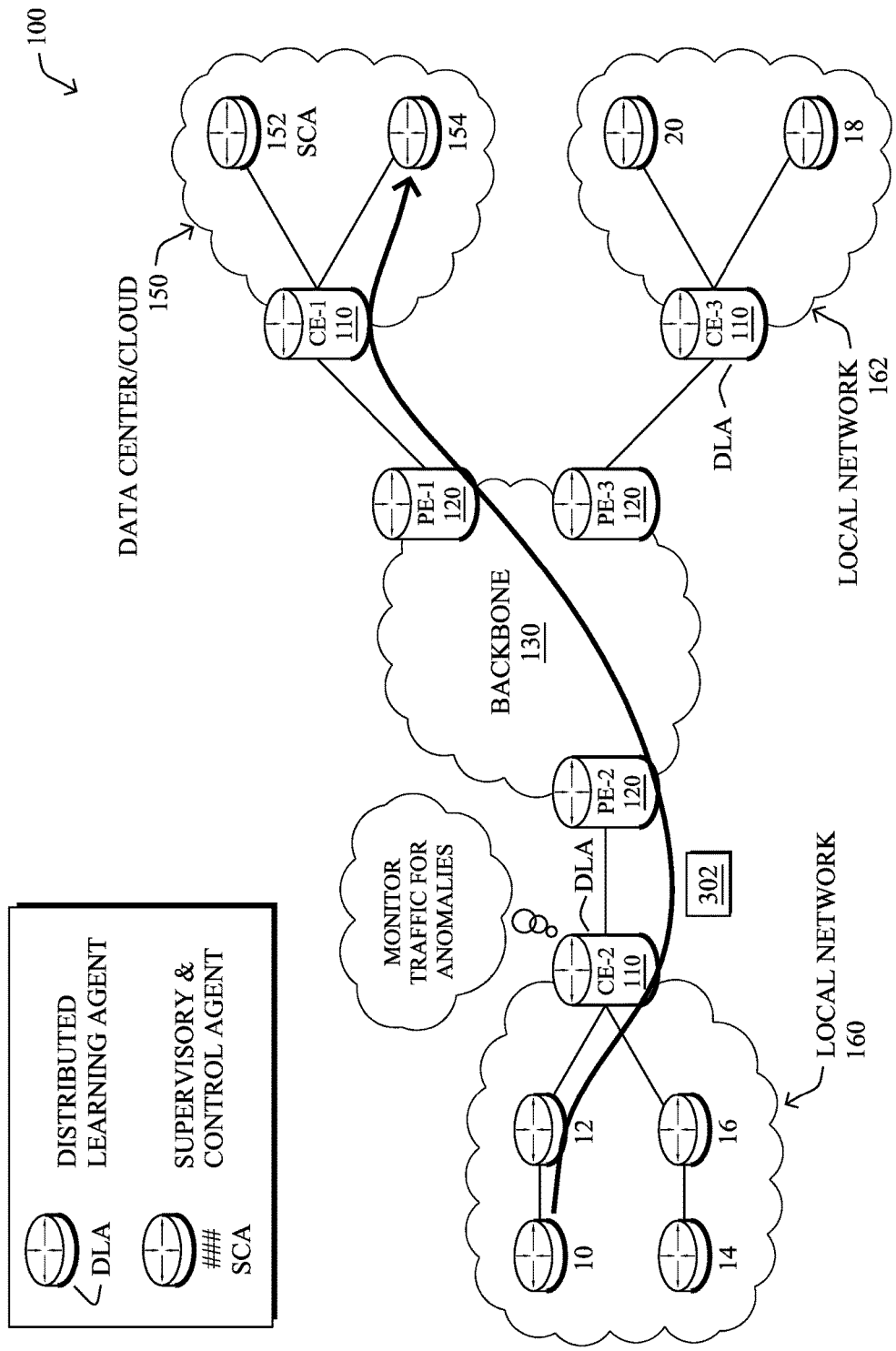
FIG. 3 illustrates an example self learning network (SLN) infrastructure.

An example self learning network (SLN) infrastructure that may be used to detect network anomalies is shown in FIG. 3, according to various embodiments. Generally, network devices may be configured to operate as part of an SLN infrastructure to detect, analyze, and/or mitigate network anomalies such as network attacks (e.g., by executing SLN process 248 and/or fingerprint merging process 249). Such an infrastructure may include certain network devices acting as distributed learning agents (DLAs) and one or more supervisory/centralized devices acting as a supervisory learning agent (SLA). A DLA may be operable to monitor network conditions (e.g., router states, traffic flows, etc.), perform anomaly detection on the monitored data using one or more machine learning models, report detected anomalies to the SLA, and/or perform local mitigation actions. Similarly, an SLA may be operable to coordinate the deployment and configuration of the DLAs (e.g., by downloading software upgrades to a DLA, etc.), receive information from the DLAs (e.g., detected anomalies/attacks, compressed data for visualization, etc.), provide information regarding a detected anomaly to a user interface (e.g., by providing a webpage to a display, etc.), and/or analyze data regarding a detected anomaly using more CPU intensive machine learning processes.

One type of network attack that is of particular concern in the context of computer networks is a Denial of Service (DoS) attack. In general, the goal of a DoS attack is to prevent legitimate use of the services available on the network. For example, a DoS jamming attack may artificially introduce interference into the network, thereby causing collisions with legitimate traffic and preventing message decoding. In another example, a DoS attack may attempt to overwhelm the network's resources by flooding the network with requests (e.g., SYN flooding, sending an overwhelming number of requests to an HTTP server, etc.), to prevent legitimate requests from being processed. A DoS attack may also be distributed, to conceal the presence of the attack. For example, a distributed DoS (DDoS) attack may involve multiple attackers sending malicious requests, making it more difficult to distinguish when an attack is underway. When viewed in isolation, a particular one of such a request may not appear to be malicious. However, in the aggregate, the requests may overload a resource, thereby impacting legitimate requests sent to the resource.

Botnets represent one way in which a DDoS attack may be launched against a network. In a botnet, a subset of the network devices may be infected with malicious software, thereby allowing the devices in the botnet to be controlled by a single master. Using this control, the master can then coordinate the attack against a given network resource.

DoS attacks are relatively easy to detect when they are brute-force (e.g. volumetric), but, especially when highly distributed, they may be difficult to distinguish from a flash-crowd (e.g., an overload of the system due to many legitimate users accessing it at the same time). This fact, in conjunction with the increasing complexity of performed attacks, makes the use of "classic" (usually threshold-based) techniques useless for detecting them. However, machine learning techniques may still be able to detect such attacks, before the network or service becomes unavailable. For example, some machine learning approaches may analyze changes in the overall statistical behavior of the network traffic (e.g., the traffic distribution among flow flattens when a DDoS attack based on a number of microflows happens). Other approaches may attempt to statistically characterizing the normal behaviors of network flows or TCP connections, in order to detect significant deviations. Classification approaches try to extract features of network flows and traffic that are characteristic of normal traffic or malicious traffic, constructing from these features a classifier that is able to differentiate between the two classes (normal and malicious).

As shown in FIG. 3, routers CE-2 and CE-3 may be configured as DLAs and server 152 may be configured as an SLA, in one implementation. In such a case, routers CE-2 and CE-3 may monitor traffic flows, router states (e.g., queues, routing tables, etc.), or any other conditions that may be indicative of an anomaly in network 100. As would be appreciated, any number of different types of network devices may be configured as a DLA (e.g., routers, switches, servers, blades, etc.) or as an SLA.

Assume, for purposes of illustration, that CE-2 acts as a DLA that monitors traffic flows associated with the devices of local network 160 (e.g., by comparing the monitored conditions to one or more machine-learning models). For example, assume that device/node 10 sends a particular traffic flow 302 to server 154 (e.g., an application server, etc.). In such a case, router CE-2 may monitor the packets of traffic flow 302 and, based on its local anomaly detection mechanism, determine that traffic flow 302 is anomalous. Anomalous traffic flows may be incoming, outgoing, or internal to a local network serviced by a DLA, in various cases.

In some cases, traffic 302 may be associated with a particular application supported by network 100. Such applications may include, but are not limited to, automation applications, control applications, voice applications, video applications, alert/notification applications (e.g., monitoring applications), communication applications, and the like. For example, traffic 302 may be email traffic, HTTP traffic, traffic associated with an enterprise resource planning (ERP) application, etc.

In various embodiments, Internet Behavioral Analytics (IBA) may be used as part of the anomaly detection mechanisms in network 100. In general, IBA refers to the use of advanced analytics coupled with networking technologies, to detect anomalies in the network. Although described later with greater details, the ability to model the behavior of a device (networking switch/router, host, etc.) will allow for detection of the presence of a malware, which is complementary to the use of firewalls that rely on static signatures. Observing behavioral changes (deviation from modeled behavior) thanks to (aggregated) flows records, deep packet inspection, etc., may allow detection of an anomaly such as an horizontal movement (e.g. propagation of a malware, etc.), or an attempt to perform information exfiltration.

As noted above, the SLN architecture disclosed herein may include any number of DLAs. Each DLA may be operable to perform network sensing and/or to receive such information from one or more other nodes in the network. For example, a networking device may obtain observation information regarding the network traffic and operational state of the network via mechanisms such as Netflow from Cisco Systems, Inc., Netconf from Cisco Systems, Inc., One PK from Cisco Systems, Inc., deep packet inspection (DPI), or similar mechanisms. A DLA can then use these observations as input to one or more machine learning/anomaly detection processes using the features collected from the network sensing functions. In one embodiment, a DLA or another network device may also be operable to perform an anomaly moderation function that combines the data from different anomaly detection processes (e.g., the features, scores, network characteristics, etc.), to detect a single anomaly. In further embodiments, the architecture may also include a network control component in charge of mitigating (offending/attacking) traffic in presence of DDoS anomalies due to malware attempting to perform data exfiltration, etc. Such mitigation may entail dropping traffic, policing traffic, shaping traffic, redirecting or diverting traffic, etc. In one embodiment, the SLA may collect anomalies reported by the DLAs and augment the anomalies with contextual data, host the visualization back-end, and/or performs a number of actions related to DLA orchestration.

At all layers of the system, decisions are made in order to determine actions from a learning standpoint: free parameters of the different anomaly detection processes, moderation of anomalies according to residuals scores, strategies to merge anomalies into higher level anomalies, and the like. At all levels, the system may also treat potentially compromised devices and/or applications equally. However, such mechanisms may also fail to take into account the risk level of a particular device, the type of traffic, etc., so as to adapt the system automatically to take the appropriate actions (e.g., more aggressive tracking of a high risk device or traffic type, etc.).

According to various embodiments, an SLN may also make use of anomaly "fingerprints" to represent different anomalies that the system may detect. Generally, a fingerprint may be a hash that uniquely identifies each type of anomaly that the system can detect. More precisely, fingerprints can take the form of a set of bits where each bit represents a specific tag which, in turn, corresponds to a specific networking concept (e.g., TCP, UDP, port-related issue, server behavior, specific application such as DNS, HTTP, etc.). Notably, assume that each anomaly detector $AD_i$ reports a detection score $S_i$. In such a case, these scores may be concatenated into a single vector S. A statistical model can then detect outliers in the vector. In one embodiment, this statistical model might operate by tracking the relevant percentile p, (typically, 99.9%) of each element of the vector S. If a score is beyond this percentile, an anomaly, denoted $A_i$, is raised and associated to a flagset $F_i$, that is, a bitset $\{b_k\}_{k=1 \ldots N}$ where $b_k$ is 1 if the kth dimension of the score $s_k > p_k$. In another embodiment, the statistical model might be based on a kernel method (e.g., Kernel Density Estimation, one-class SVMs, etc.). In yet another embodiment, a simple parametric estimation (e.g., Gaussian, Exponential, Power Law) can be used for the model.

Particularly, a networking device/node may construct a fingerprint by reducing the dimensionality of the flagset, whose dimension is the number of features in the system, to a reduced number of dimensions that are particularly relevant to a network administrator. Each of these dimensions is referred to as a tag herein, which represents a networking significance. For instance, all features that are relevant to the TCP protocol may give rise to a tag PTCP. The first letter of the tag name indicates the type of tag (e.g., 'P' indicates that this is a transport protocol-related tag). Similarly, a BSERV tag (e.g., 'B' denotes a behavioral pattern) may represent all features that relate to a behavior typical of a server. In other words, a fingerprint characterizes the essential "components" that are constitutive of the feature sets used by all of the anomaly detectors combined, thus leading to specifying a mapping model between the features set and the corresponding network characteristics. Hence, a fingerprint is designed such that it is unique to a given type of anomaly. Various properties of an anomaly can be tracked using such a fingerprint, such as the severity of the anomaly, etc., while also providing a human-readable label for the anomaly. Each tag may also be associated with an intensity, which denotes how important this particular tag is with respect to the underlying anomaly.

While the fingerprints proposed herein allow for the representation of different network anomalies, various scenarios may arise:

1. A specific anomaly can, in some circumstances, lead to multiple fingerprints. Indeed, a cyber attack can be composed of different steps along the so-called kill chain (e.g., insertion, vulnerability scanning, command and control communication, data theft and transmission, etc.), which will give rise to a sequence of fingerprints in time. Consequently a specific attack may lead to a sequence of fingerprints.
2. Given the multi-level nature of an IBA architecture, which monitors anomalies at multiple abstraction levels (e.g., host-centric, application-centric, graph-centric), the same anomaly can yield multiple fingerprints for different conversations across the network. For instance, the SLN may detect a DDoS attack (e.g., a SlowLoris attack) as a generic anomaly for HTTP traffic, giving rise to a fingerprint A, and as a specific problem for the server under attack, giving rise to fingerprint B. In some embodiments, the system may generate a third fingerprint C, which is the combination of A and B, for the HTTP traffic from/to the server under attack. In other words, the mechanisms described herein allow the system to merge fingerprints A and B into a single fingerprint C. The proper merging of fingerprints is of the utmost importance in order to provide the appropriate level of contextual information to the user for further investigation.
3. Multiple anomalies can occur at the same time in different regions of the network and still be completely related. In this case, we need a mechanism to tell them apart and report as two distinct events.

Fingerprint Merging and Risk Level Evaluation for Network Anomaly Detection

The techniques herein provide mechanisms to manage fingerprints in the context of IBA. This includes the creation of fingerprints to account for "co-detection" from anomaly detection mechanisms/processes that operate at different abstraction levels. In one aspect, the techniques herein may create an SLN_ANOMALY event/message that lists the fingerprints generated during an anomaly. Finally, mechanisms are introduced herein to select the fingerprint that is most relevant to the underlying networking anomaly, and, if needed, split the event into two distinct events if appropriate (e.g., because of the co-occurrence of two anomalies in the same region of the network).

In further aspects, the techniques herein also provide for the gathering and caching of historical data related to reported anomalies along with contextual data. In another aspect, the techniques herein may be used to dynamically compute the risk level of a specific host or traffic type using machine learning techniques. Further, a number of SLN system parameters may be adjusted so as to support the active tracking of specific devices and/or application type with finer granularity, potentially specific modeling on a per host/application basis. In a further aspect, the techniques herein may be used to trigger specific mitigation actions tied to the dynamic detection of a high risk device and/or traffic type.

Specifically, according to one or more embodiments of the disclosure as described in detail below, a device in a network receives fingerprints of two or more network anomalies detected in the network by different anomaly detectors. Each fingerprint comprises a hash of tags that describe a detected anomaly. The device associates the fingerprints with network records captured within a timeframe in which the two or more network anomalies were detected. The device compares the fingerprints associated with the network records to determine that the two or more detected anomalies are part of a singular anomaly event. The device generates a notification regarding the singular anomaly event, wherein the notification includes those of the fingerprints that are associated with the singular anomaly event.

Illustratively, the techniques described herein may be performed by hardware, software, and/or firmware, such as in accordance with the fingerprint merging process 249, which may include computer executable instructions executed by the processor 220 (or independent processor of interfaces 210) to perform functions relating to the techniques described herein, e.g., in conjunction with routing process 244 (and/or SLN process 248).

Figure 4:
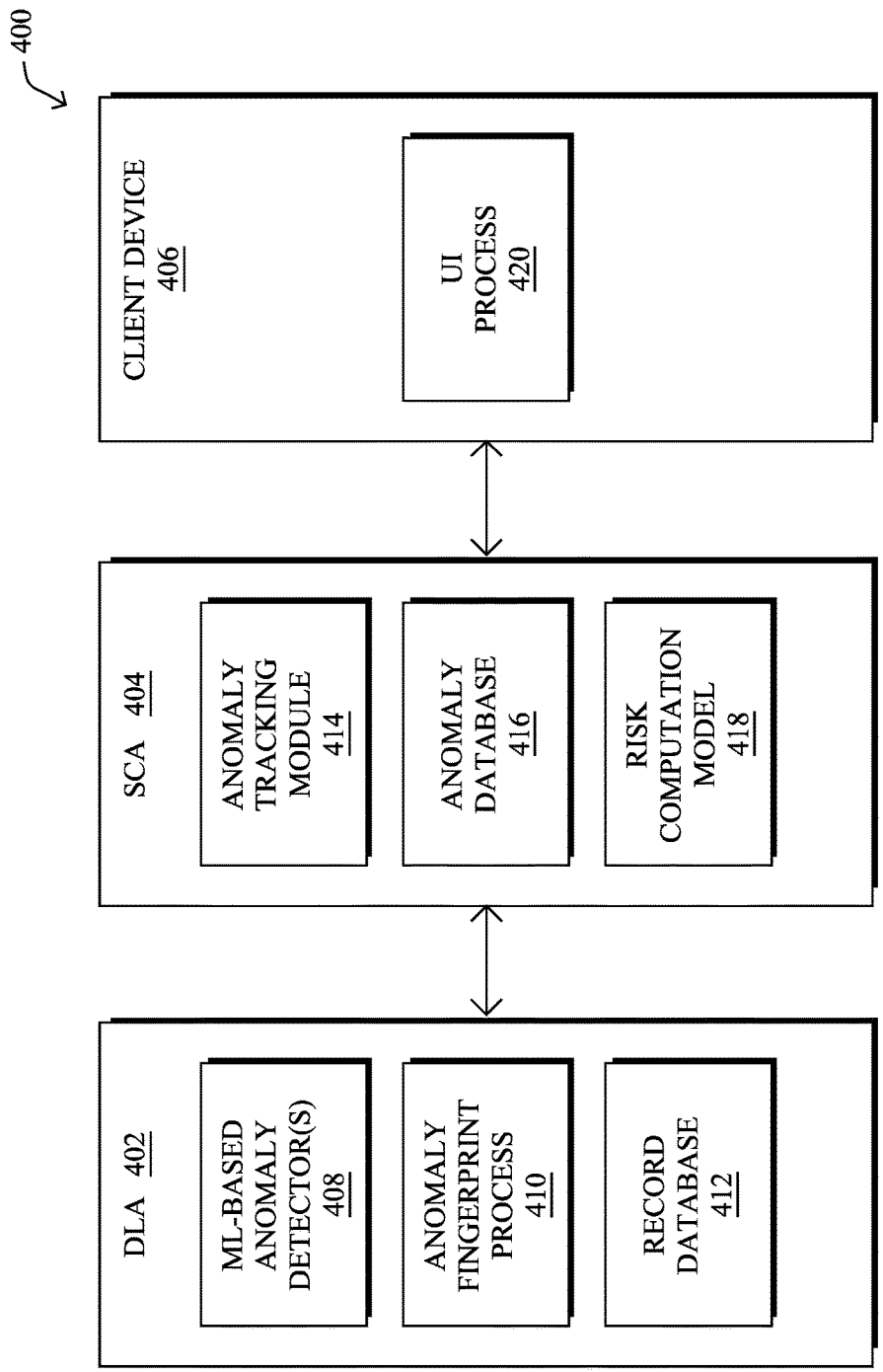
FIG. 4 illustrates an example architecture for an SLN.

Operationally, an architecture 400 is illustrated in FIG. 4 for an SLN, according to various embodiments. As shown, and as described above, an SLN implementation may include one or more DLAs 402, at least one SCA 404, and potentially one or more client devices 406 that interface with SCA 404 (e.g., an NMS, etc.). The devices 402-406 may execute modules/processes 408-420 as part of an SLN process (e.g., SLN process 248). As would be appreciated, processes 408-420 may be standalone applications, implemented as part of a single application, or combined in any other manner. In addition, the functionality described herein with respect to any of processes 408-420 may be optional in certain implementations. Further, while modules/processes 408-420 are shown as being executed by specific devices 402-406 in FIG. 4, they may also be implemented on any of the other devices shown, in other embodiments. For example, while anomaly fingerprint process 410 is illustrated as being executed by DLA 402, process 410 may also be executed in whole, or in part, by SCA 404, in other embodiments.

Client device 406 may be any form of client device such as a desktop computer, laptop computer, mobile device, wearable device, etc. that executes a user interface (UI) process 420. In various embodiments, UI process 420 may communicate with SCA 404 to provide the user of client device 406 with information regarding the anomaly detecting SLN deployed in the network (e.g., via a display, etc.). Additionally, UI process 420 may be configured to allow the user to provide supervisory control over the SLN by sending control parameters and/or instructions from client device 406 to SCA 404. For example, the user of client device 406 may request additional information from the SLN regarding a particular portion of the network, traffic flow, etc. As would be appreciated, UI process 420 may be a stand-alone application or may alternatively be implemented as a web-based interface such as an interface based on the Representational State Transfer (REST) protocol or the like. In further embodiments, SCA 404 may execute UI process 420, allowing the user to interface with SCA 404 directly.

As show, DLA 402 may execute one or more ML-based anomaly detectors 408. Generally, anomaly detector 408 may analyze information regarding the state of the network and, based on the analysis, label the information as either normal or indicative of a network anomaly. Such information may include, but is not limited to, traffic information (e.g., the applications associated with the traffic, the volume of traffic, the source and/or destination of the traffic, etc.), device information (e.g., memory consumption, processor consumption, etc.), or the like.

In various embodiments, the ML-based anomaly detectors 408 may be unsupervised or supervised machine learning processes such as ANNs, clustering processes, or the like. In other words, detector(s) 408 may detect anomalous behavior based on the deviation of observed network behavior from a trained behavioral model. This differs from supervised approaches that associate a particular pattern with a classification/label (e.g., if pattern Q is observed, a DoS attack is detected). In some cases, each of anomaly detectors 408 may analyze different sets of features/observations regarding the network. For example, one of anomaly detectors 408 may be configured to analyze a particular type of traffic (e.g., HTTP traffic, etc.), information regarding a particular type of host or other device, etc.

In some embodiments, DLA 402 may execute an anomaly fingerprint process configured to perform the actions described herein with respect to anomaly fingerprints. In particular, anomaly fingerprint process 410 may analyze anomaly detection results from anomaly detectors 408 and/or a local database 412 of network records. Network records in local database 412 may be records obtained from any number of network monitoring mechanisms available within the network (e.g., Netflow records, etc.). In some cases, only network records temporally related to an anomaly detected by anomaly detectors 408 may be stored in database 412. For example, DLA 402 may store network records obtained during a certain timeframe in which an anomaly was detected.

SCA 404 may execute an anomaly tracking module 414, in some embodiments. Generally, anomaly tracking module 414 may receive as input anomaly notification messages reported by each DLA to SCA 404. In response to receiving an indication of a new anomaly event from DLA 402, anomaly tracking module 414 may store information regarding the reported anomaly event according to the device originating the offending traffic flows marked as anomalous.

In some cases, it may not be possible to identify the source of the anomaly. In such cases, anomaly tracking module 414 may track other information regarding the anomaly such as the type of traffic flagged as anomalous. For example, an application-centric attack detector 408 may only detect the presence of a specific DoS attack without being able to identify the device sourcing the offending traffic. Consequently, anomaly tracking module 414 may be configured to store various types of information regarding a detected anomaly such as a device ID (e.g., indicating a compromised or misbehaving device), a type of traffic, or the like.

Anomaly tracking module 414 may maintain a local anomaly database 416 using the host ID or the Traffic type ID as a key and pointing to a number of data points: 1.) a list of anomalies reported (e.g., per type, severity), along with the corresponding timestamp and/or 2.) contextual information (e.g., the type of device, traffic type, host name, etc.).

In further embodiments, SCA 404 may execute a risk computation module 418 (e.g., as part of SLA process 248) configured to compute a risk metric dynamically for the set of devices/traffic types for which anomalies have been reported in the past. The role of risk computation module 418 is two-fold. First, by combining topological information collected by the SLA and the anomaly-related information collected by anomaly tracking module 414, risk computation module 418 can detect patterns in the list of anomalies that might reveal advanced persistent threats (APT). Indeed, APTs typically involve different steps (e.g., insertion, vulnerability scanning, command and control communication, data theft and transmission, etc.) that may occur several days or weeks apart for the sake of stealthiness. To this end, risk computation module 418 may cluster anomalies over a time range that may span several weeks or even months. For example, anomalies might be clustered based on their associated context and the underlying topology (e.g., using techniques that support clustering based on a distance function, such as DBSCAN, k-medoids, k-modes). The clusters generated by this step can be considered as meta-anomalies in their own right, and, from that respect, can be analyzed using an outlier detection technique (e.g., using local outlier factor analysis or k-nearest neighbors), to identify such meta-anomalies that stand out and might be the result of APTs present in the network.

Second, risk computation module 418 may perform a predictive analysis of anomaly events. In particular, by using time-series methods (e.g., Hidden Markov Models, Gaussian Processes, Condition Restricted Boltzmann Machines, etc.) on the stream of anomalies coming from each DLA, the system may anticipate anomalies (and potentially suppress/mitigate those proactively) that are due to very long-term correlations (such as events that occur once a month or a year, such as the Black Friday rush in a retail environment, and might not be tractable directly at the edge). Further, the system may offer extra information to UI process 420 by providing the level of "risk" for a specific host and/or application, based on its history.

Referring now to FIGS. 5A-5F, examples of anomaly handling in an SLN are illustrated, according to various embodiments. As shown in FIG. 5A, a DLA 402*a* may report a detected anomaly and context information to SCA 404 via an SLN_Anomaly( ) message 502. In some embodiments, SLN_Anomaly message 502 may be a custom IPv4 or IPv6 message that includes any or all of the following type-length-values (TLVs):

1.) Timing Information—In some cases, message 502 may include a timestamp indicative of when the anomaly occurred or was first detected, a duration indicative of the anomaly, or any other timing information regarding the anomaly.
2.) Anomaly ID—Message 502 may include a unique identifier for the anomaly. By referring to the anomaly ID, DLA 402*a* can send updates for the anomaly to SCA 404. It also allows SCA 404 to provide feedback on the anomaly back to DLA 402*a*.
3.) Score, Confidence, Severity—Message 502 may also include information regarding the anomaly detection score, degree of confidence in the detection, and/or an indication of the severity of the detected anomaly.
4.) Anomaly Label—Message 502 may include a human-readable field that identifies the particular anomaly.
5.) Context/Fingerprint Info.—While the above TLVs may provide high level information regarding the anomaly to SCA 404, message 502 may also include additional information that provides context to SCA 404 regarding the detected anomaly. In one embodiment, message 502 may include a 6-tuple that describes the hosts and applications involved in the anomaly. For example, such a 6-tuple may indicate the source address, source port, destination address, destination port, protocol (e.g., TCP, UDP, etc.), and application ID of an anomalous traffic flow. In another embodiment, message 502 may include metrics that provide numerical data about the time evolution of key network characteristics before and after the anomaly occurred. In further embodiments, message 502 may include tags that describe the anomaly in terms of whether the anomaly matches different predefined categories. In some embodiments, such tags may be represented as a fingerprint, which may be a hash with each bit representing a specific tag.

Anomaly messages may be exchanged synchronously or asynchronously, in various cases. In particular, once DLA 402*a* detects a new anomaly its state is updated, DLA 402*a* may push SLN_ANOMALY message 502 to SCA 404, automatically.

As shown in FIG. 5B, anomaly tracking module 414 of SCA 404 may add the information received via message 502 to its anomaly database 416. In particular, SCA 404 may maintain a catalog of the various SLN_ANOMALY messages received by SCA 404 from the deployed DLAs in the network. This information may be used for various administrative actions such as, e.g., providing status information to UI process 420 of client device 406 (e.g., to alert an administrator as to the detected anomalies), performing additional analysis of the detected anomalies, generating and enforcing network policies for the anomalous traffic flows, etc.

As shown in FIG. 5C, SCA 404 may determine a risk level for the anomaly event reported via SLN_ANOMALY message 502, as detailed above. In particular, risk computation module 418 of SCA 404 may detect patterns in the list of anomalies in anomaly database 416 to determine whether an APT exists. Further, in some embodiments, SCA 404 may perform a predictive analysis of the reported anomaly events, to determine a risk level for a particular host or application, based on its historical entries in anomaly database 416.

Referring now to FIG. 5D, once anomalies have been categorized and ranked based on their a risk level, SCA 404 may send a RISK_NOTIF( ) message 504 to client device 406 (e.g., for presentation by UI process 420) and/or to a policy server, to obtain a policy that should be applied according to the determined risk level for the detected anomaly event. Message 504 may be a custom unicast IPv4 or IPv6 message that notifies an administrator or policy server of the computed risk. In one example, assume that SCA 404 computes three risk levels. In such a case, message 504 may include the host and/or traffic type information associated with the anomaly event, identification of the DLA(s) that reported the anomalies, and/or the risk level computed by SCA 404 for the anomaly event. In one embodiment, anomaly tracking module 414 may use hysteresis when updating risk levels, to avoid system instabilities that would result from fast variation of risks. Note also that Risk_Notif ( ) message 504 may be used to report a decrease of the risk level for a given device and/or traffic type.

Referring now to FIG. 5E, in response to receiving RISK_NOTIF message 504, one or more parameter adjustments for the SLN may be determined by the administrator operating client device 406 or, alternatively, by a policy server. For example, a policy server/engine may select a pre-configured policy used to specify the set of specified actions for each risk level. Alternatively, an administrator may dynamically specify the list of required actions. In turn, the parameter adjustment(s) may be sent as feedback to the SLN (e.g., the deployed DLAs, etc.), to take appropriate actions. Example parameter adjustments may include, but are not limited to, the following:

1. Moderation strategy adjustment: a moderation strategy adjustment may be used to gather the input from a variety of anomaly detection processes, to potentially raise an anomaly and compute a fingerprint for the said anomaly. For example, if the administrator receives a notification reporting that the risk level for a device D keeps increasing or has exceed a specific threshold, then it may be desirable to adopt a different moderation strategy for the flows originated by the device D. Indeed, the parameters of the DLA may be adjusted to aggressively track the device D using finer grained binning models.
2. Model adjustment: the DLA may be required to build a specific model on the fly for a highly suspicious device or a device whose risk level keeps increasing. To that end, the DLA may, for example, start building models on a per host basis (an approach that generally does not scale but that may be appropriate for high risk device). Similarly, traffic type flagged as high risk may deserve the computation of a specific model for a specific application (in contrast with current approaches building models on a per group of application level in order to better scale).
3. Mitigation policy adjustment: various mitigation actions may also be performed with respect to an anomalous traffic flow. For example, a networking device may drop, police, shape, recolor, divert, or duplicate the offending traffic. In response to learning that a device or traffic type is at high risk, the administrator or policy server may initiate adaptive mitigation. For example, a policy engine or network administrator may create a mitigation rule on the fly for all devices whose risk level has exceeded a specific threshold resulting in recoloring the traffic, shaping or even redetecting the traffic for quarantining.

In one embodiment, a new IPv4/v6 message called a Risk_Mgt( ) message is specified herein and used to carry out the required actions specified above from the user or policy engine to the set of DLAs. For example, as shown, a Risk_Mgt( ) message 506 may be sent via unicast to all DLAs that raised an anomaly that caused the risk level to increase (e.g., a first DLA 402a, a second DLA 402b, through an nth DLA, DLA 402n). In another embodiment, Risk_Mgt( ) message 506 may be sent to all DLAs using a multicast message. Furthermore, in the case of high risk traffic type, Risk_Mgt( ) message 506 may refer to a traffic type thus applying to all traffics monitored by the DLA. Moreover, the administrator/NMS/policy engine may preventively request the DLA to perform the aforementioned adjustments beyond the scope of the offending device or traffic type. For example, the administrator may decide to extend the action to all mobile phones in a region, should a mobile phone be detected at high risk. Similarly, in response to detecting that a specific application A is flagged at high risk, the administrator may decide to send a preventive set of action to all DLAs, not just the DLA where the higher risk was detected in the first place.

Referring now to FIG. 5F, client device 406 or a policy engine may send a Risk_Set( ) message 508 to anomaly tracking module 414, according to various embodiments. Message 508 may be a custom IPv4 or IPv6 unicast or multicast message that indicates a known or higher risk than what is determined by SCA 404. In response to receiving message 508, the dynamically computed risk level is merely skipped in lieu of the value reported by the NMS.

Figure 6A:
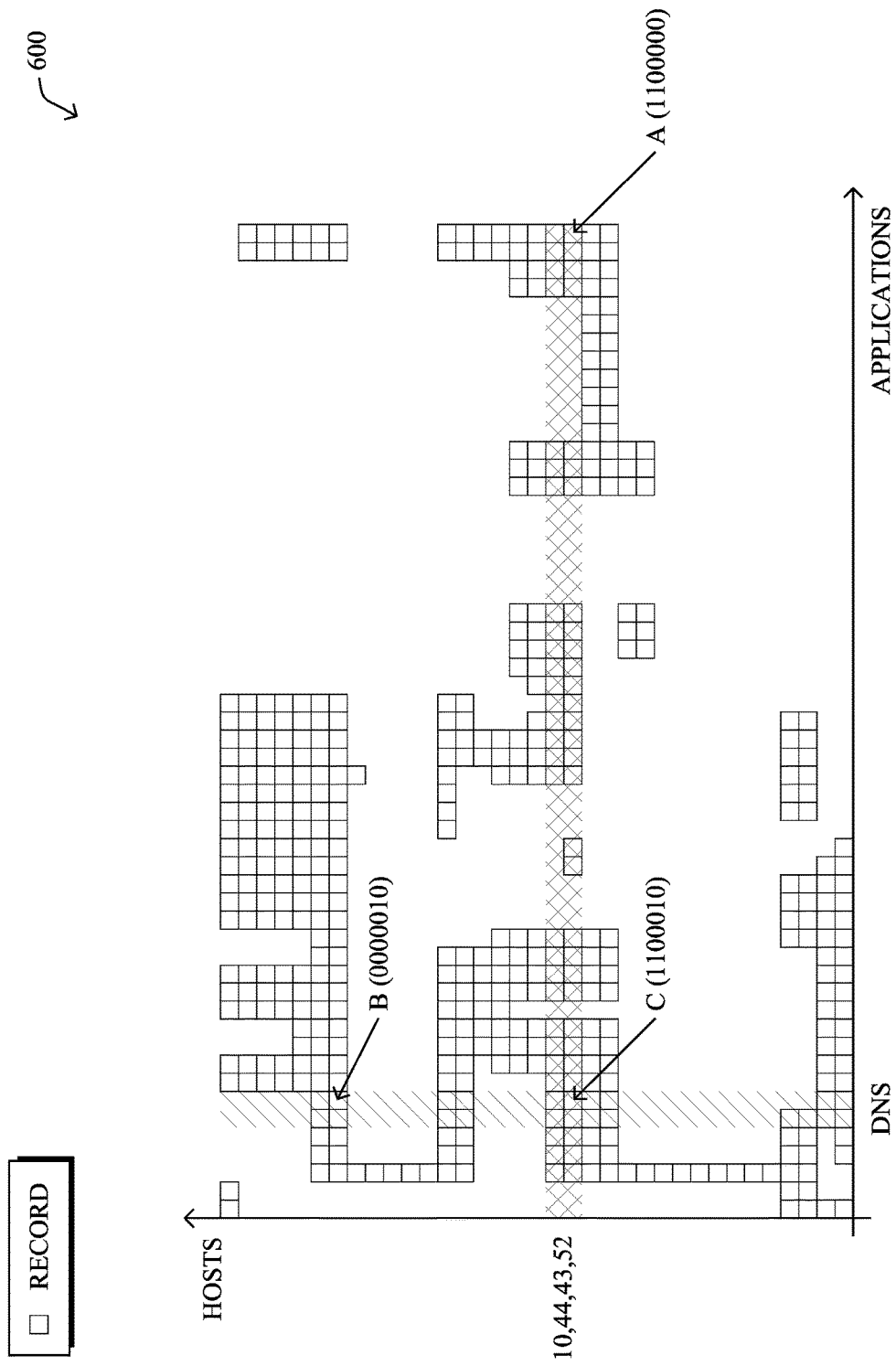
FIGS. 6A-6C illustrate example anomaly fingerprints being merged.
Figure 6B:
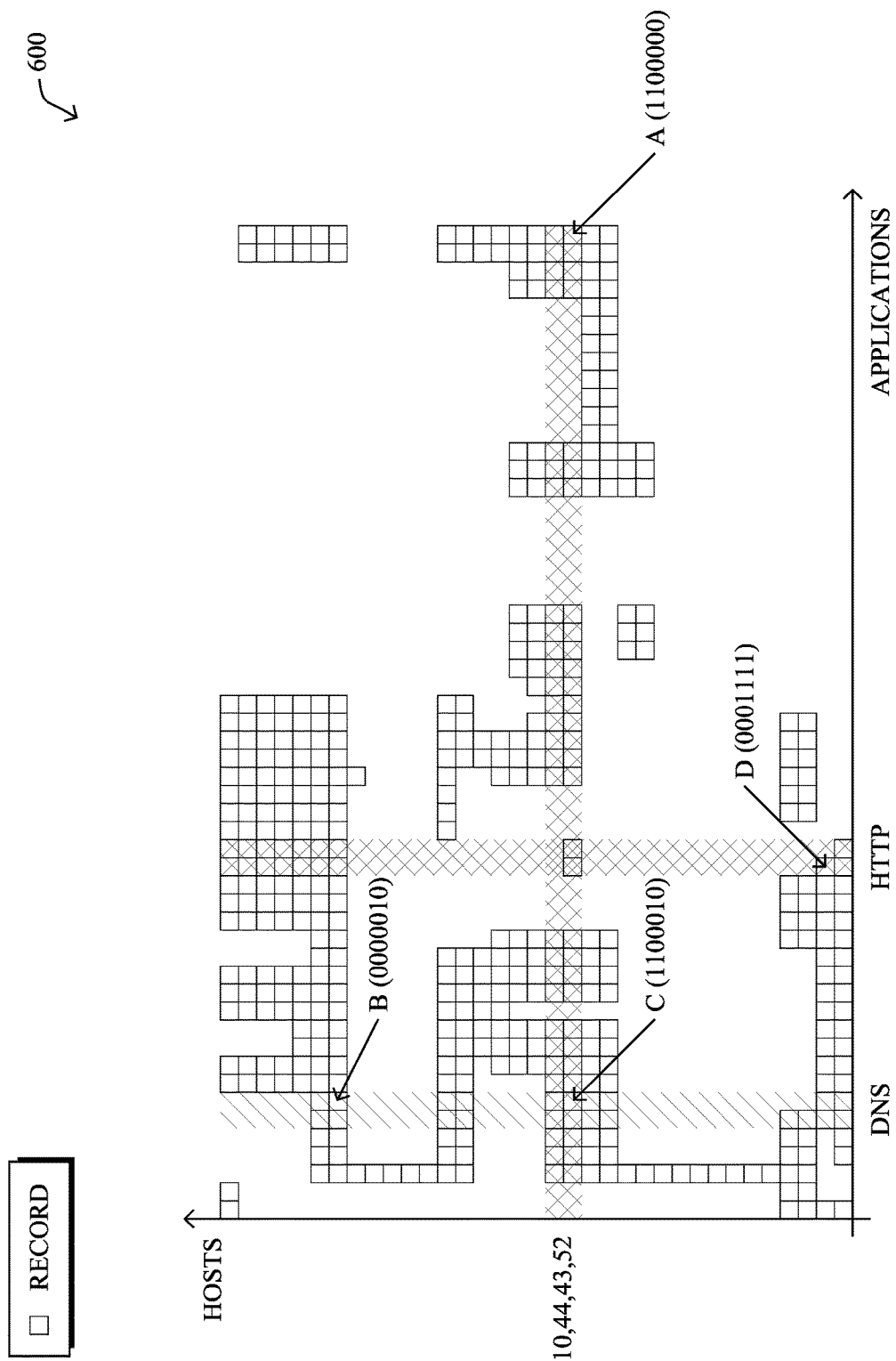
Figure 6C:
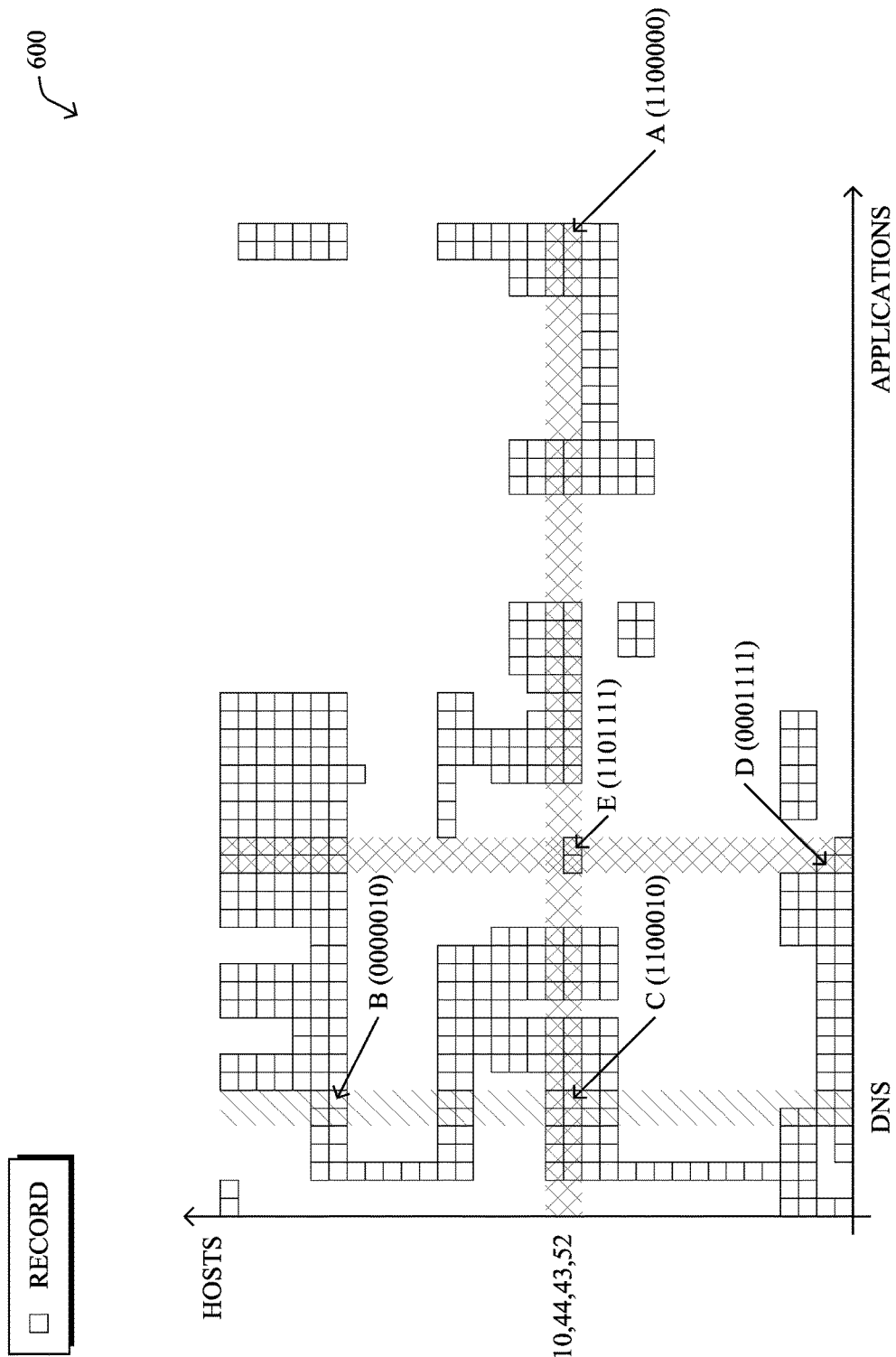

Referring now to FIGS. 6A-6C, examples are shown of anomaly fingerprints being merged, according to various embodiments. As noted previously, anomaly fingerprints allow different anomaly detectors to quantify their "perspectives" of the network and a detected anomaly. In various embodiments, mechanisms are introduced herein whereby these various perspectives are combined and reconciled in order to detect potential co-detections (and, incidentally, separate unrelated events).

In the example plot 600 shown in FIG. 6A, assume that a first anomaly detector detects a DNS tunneling anomaly from host 10.44.43.52: HostAD (e.g., using an unsupervised learning process that models the behavior of the host). Analysis of the specific host key 10.44.43.52 using the DNS-related features of the detector may result in high anomaly detection scores. Similarly, assume that a second anomaly detector is configured to detect anomalous traffic flows. In such a case, the second anomaly detector may also detect an anomaly with respect to a particular application type, such as DNS. In other words, the host-centric anomaly detector may raise a fingerprint A for host 10.44.43.52 and the application-centric anomaly detector may raise a fingerprint B for DNS traffic.

In various embodiments, the mechanisms herein may be used to determine whether (i.) these large anomaly detection scores constitute actually only one anomaly (e.g., are part of the same anomaly event), and (ii.) that this anomaly has the source IP address 10.44.43.52 and the application DNS as context. Once again, the ability to merge related fingerprints has direct implication on building the proper contextual information, which is of paramount importance. To achieve this, a fingerprint analysis process (e.g., anomalous fingerprint process 410) may consider the combinations that are actually present in the network by caching all records that have been seen in the past few minutes into a database local to the DLA (e.g., record database 412). For example, each record shown in graph 600 may include information regarding the various hosts, applications, etc. for traffic flows present in the network around the time that the anomaly detectors detected their respective anomalies. Such information may be obtained using existing network monitoring functions such as Netflow, Netconf, etc.

The fingerprint analysis process then tags each record with the fingerprint that matches the 6-tuple of a detected anomaly. For instance, when the host-centric anomaly detector raises fingerprint A (1100000) for host 10.44.43.52 as the source of the traffic flow, anomaly fingerprint process 410 may tag all records that match the rule {src_ip=10.44.53.52} with anomaly fingerprint A. Similarly, when the application-centric anomaly detector raises fingerprint B (0000010) for DNS, anomaly fingerprint process 410 may tag all records that match the rule {app_id=DNS} with anomaly fingerprint B. As a result, records concerning DNS traffic and a source address of 10.44.53.52 will be tagged with fingerprint C that is the logical OR of fingerprints A and B (i.e., 1100010). Thus, a single anomaly may give rise to three distinct fingerprints due to the use of different anomaly detectors.

To populate this list of fingerprints, the anomaly fingerprint process (e.g., process 410) needs to determine which of the fingerprints that are raised during a specific time interval belong to the same underlying event. To this end, the process may construct a hierarchy of fingerprints, whereby fingerprint A is a specialization of fingerprint B if and only (1.) A has more bits set than B and (2.) $A_i$ is set if $B_i$ is set for all i=1, . . . , m. In such a case, fingerprint B may be a generalization of fingerprint A. Hence, whenever a new fingerprint F is raised, it may be added to an existing event if its list contains a specialization or a generalization of F. If no such event exists, a new one is created.

As shown in FIG. 6B and continuing the example of FIG. 6A, consider the case in which an HTTP-related anomaly had occurred at the same time as that of the DNS-related anomaly and the host-related anomaly for 10.44.43.52. In such a case, the application-centric anomaly detector will also tag all HTTP-related records with a new fingerprint D (0001111). Since fingerprint D is neither a specialization nor a generalization of fingerprints A, B or C, anomaly fingerprint process 410 may generate two distinct SLN_ANOMALY messages to report the two separate anomaly events. In other words, the DNS and host-related anomalies may be considered part of the same anomaly event, as their respective fingerprints overlap in the records (e.g., host 10.44.43.52 sent DNS traffic). However, as there is no corresponding record to indicate that this host also sent HTTP traffic, the HTTP-related anomaly may be treated as a separate anomaly event.

In a further embodiment, a mechanism is disclosed whereby irrelevant fingerprints may be prevented from inclusion in an SLN_ANOMALY message that reports an anomaly event. Indeed, in the above example of a DNS tunneling anomaly, fingerprints A and B are basically spurious, as they are not assigned to records that are part of the attack. To this end, the system may keep only the most specialized fingerprint in the list, as long as this fingerprint is still consistent with the records captured by this anomaly. The system may determine the consistency of a fingerprint by comparing the type of traffic tagged by this particular fingerprint with the tags that are enabled in the fingerprint. For instance, if the ADNS (e.g., the tag related to DNS) is enabled on records for which app_id=HTTP, this particular fingerprint may be considered inconsistent. In another embodiment, the system may learn the consistency of a fingerprint by estimating the likelihood of the occurrence of a specific tag given the properties of the tagged records (e.g., port ranges, IP protocol, application ID, etc.). This notion of consistency is important in so far as there can be circumstances under which a very specialized fingerprint is not the correct one.

As shown in FIG. 6C, assume for a moment that host 10.44.43.52 is also generating HTTP traffic. In this case, a fingerprint E that is the logical OR of fingerprint D (for HTTP traffic) and fingerprint A (for host 10.44.43.52) (i.e., 1101111) will arise, which is a specialization of A, B, C, and D. Still, those fingerprints must not be removed from the event since fingerprint E, even though being the most specialized fingerprint in the list, is not consistent with the records captured by this anomaly (since fingerprint D is related to HTTP traffic and the anomaly contains DNS traffic as well). Indeed, in this particular case, the merging mechanism described in the second component has failed and has led to a single anomaly event capturing two underlying anomalies.

A further aspect of the teachings herein addresses this specific issue by performing an on-the-fly clustering of fingerprint list into two groups. To this end, the system may maintain a statistical model of the co-occurrence probability of various fingerprints. Based on this model, it can determine which fingerprints are likely to belong to the same underlying event, and which ones were merged due to a mere co-occurrence.

In one embodiment, this statistical model can take the form of the construction of a (sparse) correlation matrix that can then be used to cluster fingerprints based on their relative distance (using for example a k-medoids process). In another embodiment, the model can treat each dimension of the fingerprint independently, trying to reduce the fingerprint dimensionality via a statistical analysis of the co-occurrence of each tag (typically via a Principal Component Analysis or a Factor Analysis), and use a simple clustering method suitable for low-dimensional spaces (e.g., k-means, hierarchical clustering, etc.). Once the list of fingerprints has been split, a new SLN_ANOMALY event may be created with the second part of the list. In one embodiment, this clustering can be triggered only if an inconsistency is detected in the sense of the third component. In another embodiment, the procedure may be applied systematically to all anomaly events that more than a few fingerprints.

Figure 7:
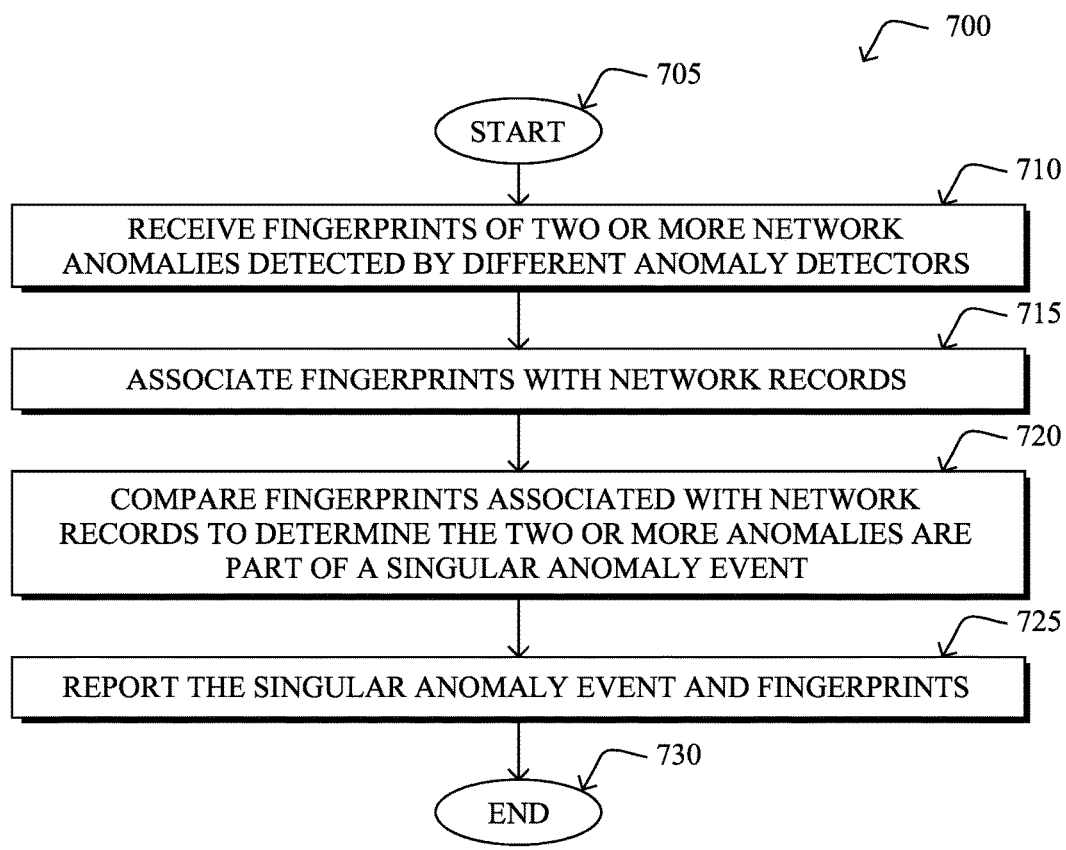
FIG. 7 illustrates an example simplified procedure for merging anomaly fingerprints.

Referring now to FIG. 7, an example simplified procedure for merging anomaly fingerprints is shown, in accordance with the embodiments herein. The procedure 700 may be performed by a device/node in a network (e.g., a non-generic computing device 200) by executing stored machine instructions such as a DLA and/or SLA in the network. Procedure 700 begins at step 705 and continues on to step 710 where, as described in greater detail above, the device may receive fingerprints of two or more network anomalies detected by different anomaly detectors. For example, one anomaly detector may detect anomalous traffic based on its traffic type (e.g., too many DNS requests may be considered anomalous) while another anomaly detector may detect anomalous traffic based on the host(s) associated with the traffic (e.g., one host may suddenly start sending large amounts of traffic, unexpectedly). Generally, a fingerprint may be a hash of tags that describe the detected anomaly. In other words, each bit in the fingerprint may correspond to a different type of tag. For example, one bit of the hash may be a PTCP tag that may be set if the anomalous traffic is conveyed using TCP. In various cases, the device may receive the fingerprints from local anomaly detectors or, in part or in whole, from one or more other nodes in the network.

At step 715, as detailed above, the device may associate the fingerprints with network records. As would be appreciated, any number of different network monitoring mechanisms may gather and record the network records (e.g., Netflow, Netconf, etc.). In some embodiments, the device may store the network records in a local store/database based on a timeframe associated with the detected anomalies. For example, the device may gather network records from a certain point in time before, during, and/or after the occurrence or detection of a network anomaly. In various embodiments, the device may associate the anomaly fingerprints with the network records based on a match between one or more characteristics of the fingerprints and the records. For example, if a fingerprint was raised by an application-centric anomaly detector for anomalous DNS traffic, the device may associate this fingerprint with each network records that also relates to DNS traffic.

At step 720, the device may compare the fingerprints associated with the network records to determine that two or more of the detected anomalies are part of a singular anomaly event, as described in greater detail above. In particular, the device may identify two or more detected anomalies as part of the same anomaly event, if their corresponding fingerprints are associated with the same network records. For example, if the device associated fingerprints from an application-centric anomaly detector and from a host-centric anomaly detector to the same record, this may indicate that the two detected anomalies that gave rise to the fingerprints are part of the same anomaly event.

At step 725, as detailed above, the device may report the singular anomaly event and fingerprints via an anomaly event notification. In some embodiments, the device may send an SLN_ANOMALY message to an SCA. In further embodiments, the device may provide the notification to a user interface or to a policy engine. In yet another embodiment, the device may select which fingerprints are included in the notification based on whether one or more of the fingerprints are specializations or generalizations of the other fingerprints. Procedure 700 then ends at step 730.

It should be noted that while certain steps within procedure 700 may be optional as described above, the steps shown in FIG. 7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, allow for the merging of anomaly fingerprints. Indeed, without this notion of fingerprint and a proper management of their lifecycle, the context associated to a specific detection event (i.e., involved hosts, applications and the detailed network characteristics) can be inaccurate, missing, or simply wrong. In further aspects, the techniques herein allow an SLN system to take appropriate actions such as actively tracking a suspicious device and/or traffic type, by dynamically computing risk levels.

While there have been shown and described illustrative embodiments that provide for the merging of anomaly fingerprints, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, such as BGP, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising: receiving, by a device in a network, two or more different fingerprints associated with two or more network anomalies detected in the network by different anomaly detectors at different computing levels, wherein each fingerprint of the two or more different fingerprints comprises a hash of tags that describe a detected anomaly;
associating, by the device, the fingerprints with network records captured within a timeframe in which the two or more network anomalies were detected, wherein the network records comprise 6-tuples, wherein each 6-tuple indicates a source address of a traffic flow, a source port of the traffic flow, a destination address of the traffic flow, a destination port of the traffic flow, a protocol used to convey the traffic flow, and an application associated with the traffic flow;
comparing, by the device, the fingerprints associated with the network records to determine that the two or more detected anomalies are part of a singular anomaly event;
merging, by the device, the fingerprints associated with the network records that are determined to be part of the singular anomaly into a single fingerprint that describes the singular anomaly;
computing, by the device, at least one of a plurality risk metrics associated with the singular anomaly event, wherein the least one of the plurality of risk metrics is dynamically updated based on anomaly event feedback;
and generating, by the device, a notification regarding the singular anomaly event and a mitigation action, wherein the notification includes those of the fingerprints that are associated with the singular anomaly event and wherein the mitigation action to be enforced dynamically changes based on the update of the at least one of the plurality of risk metrics.

2. The method as in claim 1, wherein each tag in a fingerprint of a detected anomaly is a binary bit that indicates a specific observation regarding the detected anomaly.

3. The method as in claim 1, further comprising:
identifying, by the device, a particular fingerprint from among the fingerprints as inconsistent with the fingerprints that are associated with the singular anomaly event.

4. The method as in claim 1, further comprising:
clustering, by the device, the received fingerprints using a statistical model of the co-occurrence probability of fingerprints.

5. The method as in claim 4, wherein the statistical model of the co-occurrence probability of fingerprints comprises a correlation matrix.

6. The method as in claim 4, wherein clustering the received fingerprints using the statistical model comprises:
reducing dimensionality of the received fingerprints by analyze the co-occurrence of the tags of the received fingerprints.

7. The method as in claim 1, further comprising:
causing a risk metric to be computed for a particular node in the network associated with the singular anomaly event; and
enforcing a risk mitigation policy for the particular node based on the risk metric.

8. The method as in claim 1, wherein enforcing the risk mitigation policy comprises one or more of: analyzing traffic associated with the particular node using a finer grained anomaly detector, computing a new anomaly detector to analyze the traffic associated with the particular node, or performing a network policing action on the traffic associated with the particular node.

9. The method as in claim 7, wherein the risk mitigation policy is received via a user interface.

10. An apparatus, comprising: one or more network interfaces to communicate with a network;
a processor coupled to the network interfaces and configured to execute one or more processes;
and a memory configured to store a process executable by the processor, the process when executed configured to:
receive two or more different fingerprints of two or more network anomalies detected in the network by different anomaly detectors at different computing levels, wherein each fingerprint of the two or more different fingerprints comprises a hash of tags that describe a detected anomaly;
associate the fingerprints with network records captured within a timeframe in which the two or more network anomalies were detected, wherein the network records comprise 6-tuples, wherein each 6-tuple indicates a source address of a traffic flow, a source port of the traffic flow, a destination address of the traffic flow, a destination port of the traffic flow, a protocol used to convey the traffic flow, and an application associated with the traffic flow;
compare the fingerprints associated with the network records to determine that the two or more detected anomalies are part of a singular anomaly event;
merge the fingerprints associated with the network records that are determined to be part of the singular anomaly into a single fingerprint that describes the singular anomaly;
computing, by the device, at least one of a plurality risk metrics associated with the singular anomaly event, wherein the least one of the plurality of risk metrics is dynamically updated based on anomaly event feedback;
and generate a notification regarding the singular anomaly event; and a mitigation action, wherein the notification includes those of the fingerprints that are associated with the singular anomaly event and wherein the mitigation action to be enforced dynamically changes based on the update of the at least one of the plurality of risk metrics.

11. The apparatus as in claim 10, wherein each tag in a fingerprint of a detected anomaly is a binary bit that indicates a specific observation regarding the detected anomaly.

12. The apparatus as in claim 10, wherein the process when executed is further configured to:
identify a particular fingerprint from among the fingerprints as inconsistent with the fingerprints that are associated with the singular anomaly event.

13. The apparatus as in claim 10, wherein the process when executed is further configured to:
cluster the received fingerprints using a statistical model of the co-occurrence probability of fingerprints.

14. The apparatus as in claim 13, wherein the statistical model of the co-occurrence probability of fingerprints comprises a correlation matrix.

15. The apparatus as in claim 10, wherein the process when executed is further configured to:
cause a risk metric to be computed for a particular node in the network associated with the singular anomaly event; and
enforce a risk mitigation policy for the particular node based on the risk metric.

16. The apparatus as in claim 1, wherein the risk mitigation policy is enforced by one or more of: analyzing traffic associated with the particular node using a finer grained anomaly detector, computing a new anomaly detector to analyze the traffic associated with the particular node, or performing a network policing action on the traffic associated with the particular node.

17. A tangible, non-transitory, computer-readable media having software encoded thereon, the software when executed by a processor configured to: receive two or more different fingerprints of two or more network anomalies detected in the network by different anomaly detectors at different computing levels, wherein each fingerprint of the two or more different fingerprints comprises a hash of tags that describe a detected anomaly;
associate the fingerprints with network records captured within a timeframe in which the two or more network anomalies were detected;
compare the fingerprints associated with the network records to determine that the two or more detected anomalies are part of a singular anomaly event, wherein the network records comprise 6-tuples, wherein each 6-tuple indicates a source address of a traffic flow, a source port of the traffic flow, a destination address of the traffic flow, a destination port of the traffic flow, a protocol used to convey the traffic flow, and an application associated with the traffic flow;
merge the fingerprints associated with the network records that are determined to be part of the singular anomaly into a single fingerprint that describes the singular anomaly;
computing, by the device, at least one of a plurality risk metrics associated with the singular anomaly event, wherein the least one of the plurality of risk metrics is dynamically updated based on anomaly event feedback;
and generate a notification regarding the singular anomaly event; and a mitigation action, wherein the notification includes those of the fingerprints that are associated with the singular anomaly event and wherein the mitigation action to be enforced dynamically changes based on the update of the at least one of the plurality of risk metrics.

18. The computer-readable media as in claim 17, wherein each tag in a fingerprint of a detected anomaly is a binary bit that indicates a specific observation regarding the detected anomaly.

* * * * *